Aug. 26, 1958 A. E. KRAMER 2,849,022
COMBINED PRESSURE RELIEF AND PRESSURE INDICATING DEVICE
Original Filed Dec. 7, 1950
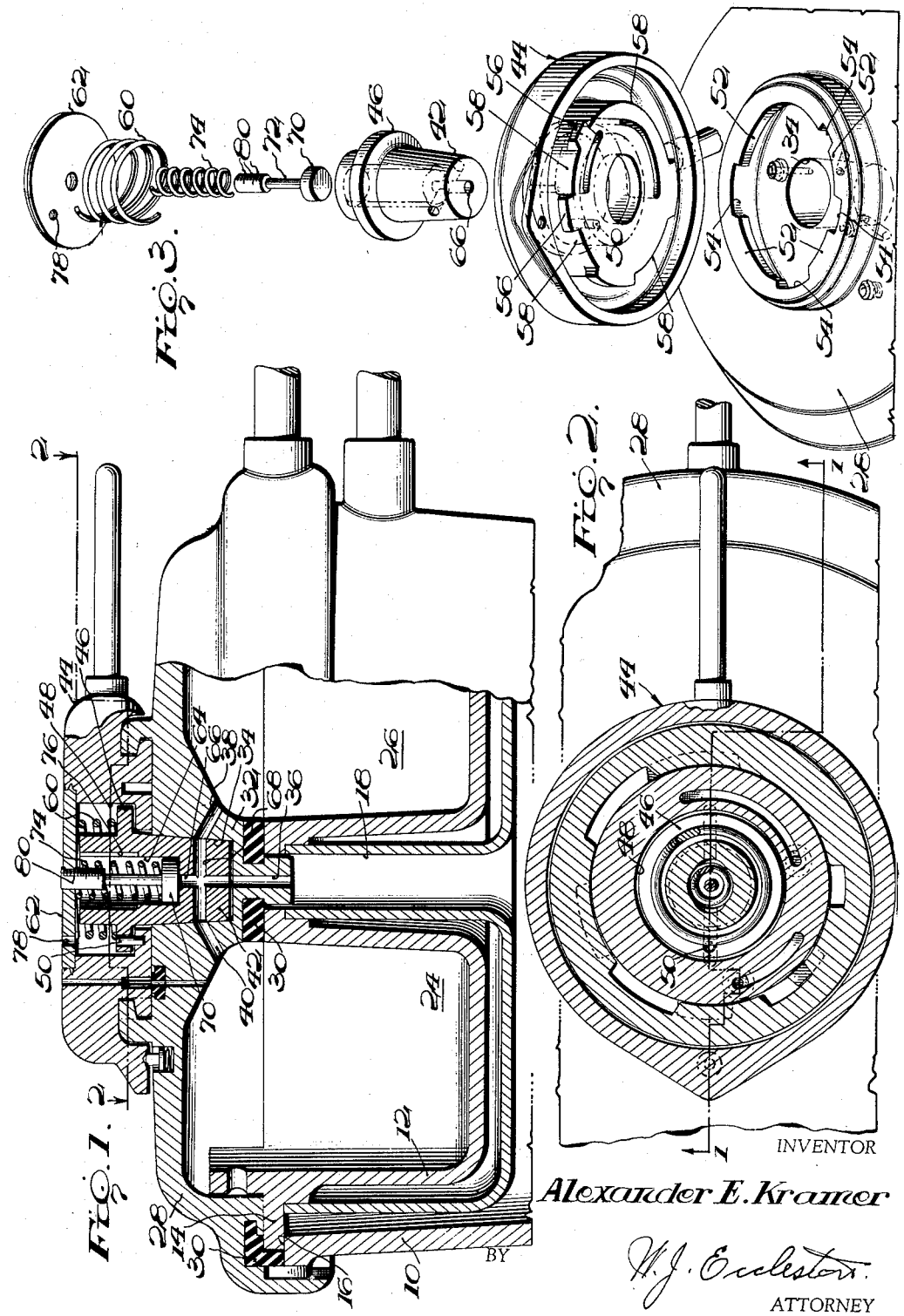
INVENTOR
Alexander E. Kramer
BY
W. J. Eccleston
ATTORNEY United States Patent Office 2,849,022
Patented Aug. 26, 1958

2,849,022

COMBINED PRESSURE RELIEF AND PRESSURE INDICATING DEVICE

Alexander E. Kramer, Washington, D. C.

Original application December 7, 1950, Serial No. 199,695, now Patent No. 2,688,322, dated September 7, 1954. Divided and this application April 13, 1954, Serial No. 423,003

6 Claims. (Cl. 137—512.2)

(Granted under Title 35, U. S. Code (1952), sec. 266)

The invention described herein, if patented, may be manufactured and used by or for the Government for governmental purposes, without the payment to me of any royalty thereon.

The present invention relates to a device for preventing the accumulation of excessive fluid pressures in confined spaces and more particularly to a pressure relief device adapted to respond to different predetermined pressures which also embodies pressure indicating means.

Pressure relief devices commonly include a single vent designed to respond at a predetermined pressure so as to prevent the accumulation of excessive pressures within the confined space protected by the device. Should the vent or pressure responsive means in the device be rendered inoperative for any reason, dangerously high pressures may be built up in the confined space. Various expedients have heretofore been suggested for avoiding this possibility. As an example, the pressure cookers in common use include a pre-loaded valve of one type or another for venting the cooker when the pressure therein exceeds a predetermined value. In addition, an elastic or fusible plug commonly is provided in the closure for these cookers which is designed to blow out at a predetermined pressure above the pressure at which the pressure relief valve normally opens. This plug thus protects the cooker against the generation of excessive pressures therein in the event the pressure relief valve is rendered inoperative for any reason, such as jamming or becoming clogged with the food being cooked. The present invention is designed particularly for use on pressure cookers to doubly guard against the generation of excessive pressures in these cookers but obviously could be adapted for many other analogous uses.

Accordingly, an object of the invention is to provide a new and improved device for controlling flow of fluid under pressure which embodies combined pressure limiting and pressure indicating means.

Another object of the invention is to provide a new and improved combined pressure relieving and pressure indicating device which is designed to respond to different predetermined pressures.

A further object of the invention is to provide a new and improved combined pressure relief and pressure indicating device in which the pressure indicating means comprises a readily visible telltale to indicate that the device is operating normally.

A more general object of the invention is to provide a new and improved combined pressure relief and pressure indicating valve which is relatively simple in construction, inexpensive to manufacture and easy to use but which, nevertheless, is durable and reliable.

These and other objects, advantages and capabilities of the invention will become apparent from the following description wherein reference is had to the accompanying drawing in which:

Fig. 1 is a fragmentary view, partly in elevation and partly in vertical section, along the line 1—1 of Fig. 2 showing a compartmented pressure cooker embodying the present invention;

Fig. 2 is a fragmentary view of the pressure cooker shown in Fig. 1 partly in top plan and partly in section on the line 2—2 of Fig. 1, and Fig. 3 is an exploded view of the improved pressure relieving and pressure indicating device of the present invention.

The present application is a division of my copending application for patent, Serial No. 199,695 for a "Compartment Pressure Cooker," filed December 7, 1950, now Patent No. 2,688,322. The combined pressure relieving and pressure indicating device covered by this application, while designed particularly for use in this pressure cooker, is susceptible to use in other apparatus where the pressure to be generated in a confined space must be controlled and double assurance is desired that such protection is being obtained.

As disclosed in that patent, and in Fig. 1 of the drawings of this application, the pressure cooker comprises a main outer vessel or receptacle 10 and an inner vessel or pan 12 supported from the upper peripheral edge 16 of the outer vessel by a lateral flange 14 which rests upon this edge. Since reference may be had to the previously mentioned patent for a detailed description of the pressure cooker, only those parts of this cooker which will assist in an understanding of the construction and operation of the present invention will be described herein, and they will be described only briefly. The inner vessel 12 has a cylindrical axially extending wall defining a passage 18 open to the interior of the outer vessel 10 and radially extending walls (not shown) suitable for dividing the same into two compartments 24 and 26 of unequal size. Considering the space in the outer vessel 10 below the bottom of the inner pan 12 as a single compartment, three separate compartments are thus provided. In order to locate the compartments in the inner vessel at a predetermined angular position in the outer vessel, the two vessels are preferably provided with a cooperating positioning lug and recess (not shown).

These three compartments are sealed from each other and the exterior by a removable closure 28 and a resilient gasket 30. This closure and the peripheral edge of the outer vessel 10 are provided with cooperating locking lugs of a construction common in the pressure cooker art which both lock the closure on the outer vessel and draw it down firmly on the vessel when the closure is turned from one predetermined position at which the lugs on the closure and outer vessel interfit to a second predetermined position at which these lugs lockingly interengage one group below the other. The closure 28 has a central depending boss 32 on its underside which aligns with the annular wall in the inner vessel 12 defining passage 18, and a fluid tight seal is formed between this boss and the passage 18 by a portion of the gasket 30 when the closure is in locked position. In addition, the closure has depending radially extending walls or webs (not shown) cooperating with the radial compartment defining walls in the inner vessel 12 to define two segregated compartments in the upper portion of the outer vessel, and the gasket 30 has portions (not shown) to seal these cooperating walls.

The depending boss 32 has a generally frusto-conical recess 34 extending into the same from the upper side thereof, a central axial port or passage 36 establishing communication between the main compartment and the frusto-conical recess 34 through passages 18 in the inner vessel 12 and a plurality of generally radially extending ports or passages two of which are shown at 38 and 40. Communication may be selectively established between the main compartment and the two compartments 24 and 26 in the inner vessel 12 through these lastmentioned ports or passages by means of a valve 42 carried by a valve operating member 44 rotatably mounted on the closure 28.

This valve comprises a frusto-conical plug complementary in shape to the frusto-conical recess or valve seat 34 in the closure 28 so as to adapt the same for seating in this recess. Adjacent its upper end the valve body 42 has an external annular rib or flange 46 which is adapted to be loosely received in a cylindrical recess or well 48 in the outer side of the valve mounting and operating member 44. The latter and the valve 42 are locked against relative rotation by a pin 50 fixed in the bottom of well 48 and projecting loosely through an aperture in the flange 46 on the valve body 42 so that the valve and its operating member are relatively movable in an axial direction but not rotationally.

In the pressure cooker used to illustrate one application of the present invention, the valve body 42 is mounted to rotate upon the axis of the seat 34 between predetermined positions at least 180° remote from each other. To mount the valve for this rotary movement but yet allow ready assembly and disassembly thereof, the valve operating member 44 and closure 28 are each provided with four arcuate lugs and recesses centered on the axis of valve seat 34, the lugs and recesses on the closure being indicated by the numbers 52 and 54, respectively, in Fig. 3, while those on the valve operating member 44 are indicated by the numbers 56 and 58, respectively. The lugs 52 on the closure which project inwardly and are spaced upwardly of the plane of the topside thereof are of progressively increasing end-to-end length, while the recesses 54 between these lugs are of progressively decreasing length.

In contrast to this, the lugs 56 on the valve operating member 44 project outwardly. Moreover, these lugs have an overall diameter slightly less than the overall base diameter of the lugs 52 on the closure, are of slightly less length than the recesses 54 in the closure and are spaced to correspond with the spacing of these recesses 54 so that the recesses 58 in this valve operating member corresponds in dimensions to the dimensions of the lugs 52 on the closure. In other words, the lugs and recesses on the valve operating member are reversely complementary to those on the closure. Thus, at one relative angular position of the closure 28 and valve operating member 44, the lugs on one of these parts will interfit with the recesses on the other. Moreover, the lugs are designed to be carried into tight underlapping overlapping relation when the operating member 44 is moved from this predetermined position so as firmly to wedge or press the bottom side of the operating member against the topside of the closure. Since there are four lugs on both the closure and valve operating member, the latter will always be urged against the closure 28 along four areas thereof of more or less extent in an end-to-end direction, at least two of which areas are substantially diametrically opposite, so that the valve operating member is evenly pressed against the topside of the closure. To facilitate initial interengagement of the lugs 52 and 56, the radially extending edges thereof may be tapered or beveled slightly.

Referring to Fig. 1, it will be noted that the end of the valve body 42 extends to a point just short of the bottom or end of the valve seat 34, and the flange 46 is spaced a slight distance from the bottom of the well 48 when the valve is held in fully seated position by the valve operating and mounting member 44. The valve body 42 is biased to this position by an expansion spring 60 reacting between the flange 46 and a cover plate 62 for the well 48 removably secured in the upper end of the latter by suitable means such as coarse threads. Since the outer end of the valve body 42 is spaced a slight distance from the inner side of the cover plate 62 when the valve is fully seated, it is held in seated position solely by the biasing force of the spring 60. Thus, by using a calibrated spring, the valve 42 can be biased to seated position with a predetermined force for a purpose to be described.

The valve body 42 has a differential axially extending bore including an accurately machined cylindrical part 64 and a smaller inlet port or passageway 66 for establishing communication between the cylindrical part or passage 64 and the axial inlet passage 36 in the boss 32 on closure 28. In addition, suitable radial passages 68 are provided to establish communication between the axial inlet passageway 66 and the radial passages 38 and 40 in the boss 32.

Reciprocable in the cylindrical passage 64 in the valve body 42 is a piston valve having a head 70 machined to provide a substantially fluid tight but reciprocable fit with the cylindrical passage 64 and a stem 72 projecting axially outwardly of the head. The head 70 is seated against the end of the cylindrical passage 64 to close the inlet passage 66 from the exterior by an expansion spring 74 calibrated to yield predetermined amounts in response to predetermined increases in the pressure in the inlet passage 66. A by-pass or vent in the form of longitudinal grooves 76 is provided in the walls of the cylindrical passage 64 to vent the pressure in the inlet passage 66 when the valve head 70 is moved outwardly in the cylindrical passage a predetermined amount due to a predetermined increase in the pressure in the inlet 66. Pressurized fluid thus escapes into the well 48 and from the well to the exterior through an aperture 78 in the cover plate 62. When the device of the present invention is used in a pressure cooker, the spring 74 may be calibrated to allow the cooker to vent when the steam pressure therein exceeds 15 pounds per square inch.

Adjacent its outer end, stem 72 is provided with graduations or indicia 80 to cooperate with the outer side of cover plate 62 in indicating the pressure to which the relief valve 70 is yielding. Preferably, this portion of the stem is enlarged to facilitate observation of the indicia. In accordance with one of the features of the present invention, the spring 60 holding the valve body 42 in seated position, is designed to yield to a force exceeding by a predetermined amount that to which the spring 74 yields. Thus, should the piston valve 70 fail to respond for any reasons, the valve body 42 will be lifted from its seat by the steam when the pressure of the latter exceeds a predetermined value. Generation of excessive pressures is thus avoided.

From the above description of the construction of the improved combined pressure relief and pressure indicating device of the present invention, its operation will be apparent as will be the fact that it comprises both a pressure indicating and pressure relief device designed normally to respond to one predetermined pressure, and under extraordinary conditions, to respond to a pressure exceeding the first pressure by a predetermined amount.

While a preferred embodiment of the invention has been shown and described, it will be apparent that variations and modifications thereof may be made without departing from the underlying principles of the invention. It is desired, therefore, by the following claims, to include within the scope of the invention, all such variations and modifications by which substantially the results of the invention may be obtained through the use of subtantially the same or equivalent means.

I claim:

1. A combined pressure relief and pressure indicating device comprising structure forming a tapered seat having an inlet passage in one end thereof, a valve body including a tapered plug adapted to seat on said valve seat and having an axially extending bore adapted to communicate at opposite ends thereof respectively with the said end of said seat in which said inlet passage is formed and a region in the device in constant communication with the atmosphere, a pre-loaded valve having a head reciprocable in a portion of said bore in fluid tight relation thereto in response and in proportion to the pressure in the inlet to said seat, means to vent the pressure in the inlet side of said seat through said bore in response to predetermined movement of the valve head under the influence of inlet pressure, and yieldable means to urge said plug axially to seated position with a force exceeding by a predetermined amount the force required to overcome the pre-loaded reciprocable valve.

2. A combined pressure relief and pressure indicating device comprising structure forming a frustro-conical valve chamber having an inlet passage in one end thereof, a valve body including a frustro-conical plug adapted to seat in said chamber and having an axially extending bore adapted to communicate at opposite ends thereof respectively with the inlet passage to said chamber and a region in the device in constant communication with the atmosphere, a pre-loaded valve having a head reciprocable in a portion of said bore in fluid tight relation therewith in response and in proportion to the pressure developed in the said inlet passage, means to vent the pressure in the inlet passage through said bore in response to predetermined movement of the valve head under the influence of inlet pressure, means to mount said valve plug and the structure forming said valve chamber for relative axial and rotational movement and yieldable means to urge said plug and the structure forming said valve chamber relatively in a direction to seat said plug with a force exceeding the pre-load on said reciprocable valve by a predetermined amount.

3. A combined pressure relief and pressure indicating device comprising structure forming a valve seat having an axially located inlet passage and at least one lateral passage, a valve including a plug adapted to seat on said seat and having at least one lateral passage to cooperate with the lateral passage in said seat and an axially extending bore adapted to communicate adjacent opposite ends thereof respectively with said inlet passage and a region in the device in constant communication with the atmosphere, a pre-loaded valve having a head reciprocable in a portion of said bore in fluid tight relation therewith in response and in proportion to the inlet pressure, a vent to release inlet pressure to the atmosphere through said axially extending bore rendered operative upon predetermined movement of the valve head, structure to both mount and operate said valve plug including a rotary member mounted to rotate upon a fixed axis coinciding with the axis of said seat, means for operatively connecting said plug to said rotary member for axial movement toward and from seated position including structure to lock the plug and rotary member against relative rotary movement and a spring to urge said plug axially relative to said rotary member in a direction to seat the plug with a force exceeding the pre-load on said reciprocable valve by a predetermined amount.

4. A combined pressure relief and pressure indicating device comprising structure forming a tapered seat having an inlet passage in one end thereof, a valve body including a tapered plug adapted to seat in said valve seat and having an axially extending bore adapted to communicate at opposite ends thereof respectively with the said end of said seat in which said inlet passage is formed and a region in the device in constant communication with the atmosphere, a pre-loaded valve having a head reciprocable in a poriton of said bore in fluid tight relation thereto in response and in proportion to the pressure in the inlet to said seat, means to vent the pressure in the inlet side of said seat through said bore in response to predetermined movement of the valve head under the influence of inlet pressure, yieldable means to urge said plug axially to seated position with a force exceeding by a predetermined amount the force required to overcome the pre-loaded reciprocable valve and pressure indicating means including a readily visible telltale rendered operative by the pre-loaded valve to indicate the pressure to which the said valve is being subjected.

5. A combined pressure relief and pressure indicating device comprising structure forming a valve seat having an inlet passage and at least one radial passage, a valve including a plug adapted to seat upon said seat and having a radial passage to cooperate with the radial passage in said seat and a bore adapted to communicate adjacent opposite ends thereof respectively with said inlet passage and a region in the device in constant communication with the atmosphere, said bore including an axially extending uniformly cylindrical part remote from the end communicating with said inlet, means to mount said valve and seat for relative axial and rotational movement including means yieldably to seat the plug with a force of predetermined magnitude, a piston valve having a head reciprocable in said cylindrical part of said bore in fluid tight relation thereto so as to be responsive to the pressure in the said bore and a stem projecting outwardly from the head, a spring to oppose movement of the piston valve under the influence of inlet pressure with a force of predetermined magnitude less than the force seating said plug, said spring being calibrated to yield in direct proportion to the magnitude of the inlet pressure, a vent to release inlet pressure to the atmosphere through said cylindrical bore rendered operative upon predetermined movement of the piston valve, and pressure indicating means rendered operative by the stem to indicate inlet pressure upon movement of the piston valve.

6. A combined pressure relief and pressure indicating device comprising structure forming a valve seat having an inlet passage and at least one outlet passage, a rotary valve including a valve plug adapted to seat upon said seat and having an outlet passage to cooperate with the outlet passage in said seat and a bore adapted to communicate adjacent opposite ends thereof respectively with said inlet passage and a region in the device in constant communication with the atmosphere, said bore including an axially extending uniformly cylindrical part remote from the end communicating with said inlet, means to interconnect said valve and seat for relative axial and rotational movement inculding means yieldably to seat the plug with a force of predetermined magnitude, a piston valve having a head reciprocable in said cylindrical part of said bore in fluid tight relation thereto so as to be responsive to the pressure in the said bore and a stem projecting outwardly from the head into an aperture in a fixed part of the said means for interconnecting said valve and seat, a spring to oppose movement of the piston valve under the influence of inlet pressure with a force of predetermined magnitude less than the force seating said valve, said spring being calibrated to yield in direct proportion to the magnitude of the inlet pressure, a vent to release inlet pressure to the atmosphere through said cylindrical bore rendered operative upon predetermined movement of the piston valve, and cooperating pressure indicating means adjacent the outer end of said stem and on the said fixed part of the said means for interconnecting said valve and seat to indicate the pressure in said inlet passage.

References Cited in the file of this patent
UNITED STATES PATENTS

| | | |
|---|---|---|
| 1,088,817 | Graham | Mar. 3, 1914 |
| 2,005,813 | Thorsen | June 25, 1935 |
| 2,033,678 | Buirk | Mar. 10, 1936 |
| 2,428,483 | Wittenburg | Oct. 7, 1947 |
| 2,468,259 | Foster | Apr. 29, 1949 |
| 2,667,891 | Hilldale | Feb. 2, 1954 |
| 2,686,531 | Eckhout | Aug. 17, 1954 |

FOREIGN PATENTS

| | | |
|---|---|---|
| 121,281 | Switzerland | 1927 |
| 715,978 | Germany | 1942 |